(No Model.)
W. O. MILLER.
HARNESS SADDLE.
No. 444,761. Patented Jan. 13, 1891.
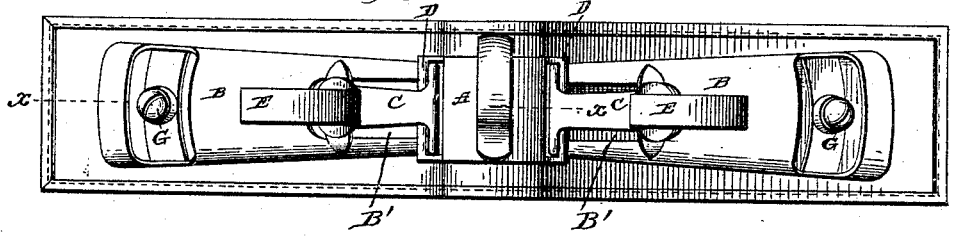
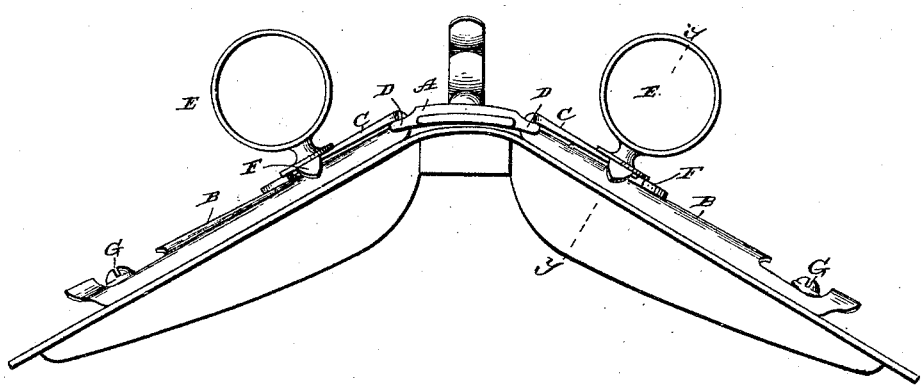
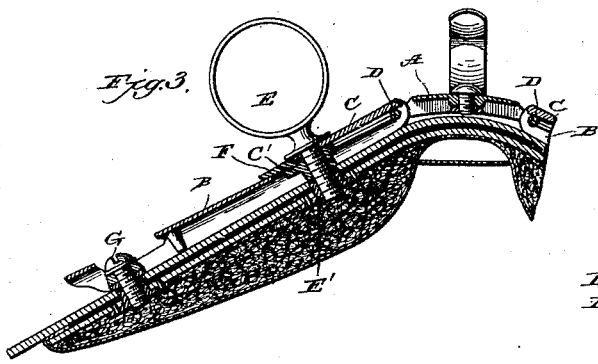
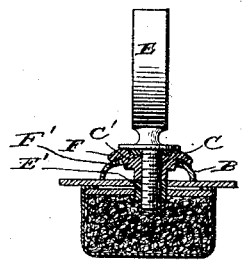
Witnesses
E. D. Smith
Thomas Durant
Inventor
William O. Miller,
By his Attorneys
Church & Church
THE NORRIS PETERS CO., PHOTO-LITHO., WASHINGTON, D. C.

UNITED STATES PATENT OFFICE.

WILLIAM O. MILLER, OF QUINCY, ILLINOIS.

HARNESS-SADDLE.

SPECIFICATION forming part of Letters Patent No. 444,761, dated January 13, 1891.

Application filed May 19, 1890. Serial No. 352,375. (No model.)

*To all whom it may concern:*

Be it known that I, WILLIAM O. MILLER, of Quincy, in the county of Adams and State of Illinois, have invented certain new and useful Improvements in Adjustable Harness-Trees; and I do hereby declare the following to be a full, clear, and exact description of the same, reference being had to the accompanying drawings, forming a part of this specification, and to the letters of reference marked thereon.

My invention has for its object particularly to improve upon the construction of the harness-tree for which I obtained Letters Patent No. 242,522, dated June 7, 1881, by the substitution of metal connections between the side plates and the check-hook plates for the leather-strap connections, as shown in said Letters Patent, whereby the tree is rendered cheaper and more durable; and it has further for its object to improve the construction of the tree in other particulars, which will be hereinafter specifically pointed out and claimed.

In the accompanying drawings, Figure 1 is a top plan view. Fig. 2 is a rear elevation. Fig. 3 is a sectional view on the line $x\ x$, Fig. 1. Fig. 4 is a section on line $y\ y$, Fig. 2.

Similar letters of reference in the several figures indicate the same parts.

Referring to the accompanying drawings, A represents the check-hook plate, and B B the side plates. Each of the side plates is provided with a hook C, which is adapted to engage with a loop, eye, or slot D, formed upon the adjacent side of the check-hook plate A, as shown, so as to form a loose connection with said check-hook plate. The hook C may extend upward through or downward through the co-operating loop of the check-hook plate, but in the form of the invention shown in the drawings it extends upward through said loop, and is prolonged and provided with an opening C' near its end, through which the shank of the terret E passes, as shown. Beneath the end of the hook C and between it and the body of the side plate is arranged what may be termed a "bridge-piece" F, the same being perforated to admit the passage of the shank of the terret through it, and serving to sustain and support the end of the hook when the terret is screwed into its socket E', located in the body of the pad, as shown in Fig. 3. In this particular instance the side plate B beneath the hook is cut away or made open, as at B', and the bridge-piece F is provided with shoulders F', which fit down within the opening and serve to maintain said bridge-piece in proper position.

By connecting the side plates and check-hook plate in the manner shown a very strong union is effected, and yet a union that does not prevent, but on the contrary admits of, the free movement of both side plates and their connected pads.

The side plates, in addition to being held to the pads by means of the terrets, are further held by screws or bolts G, as shown.

The hook on the side plate may be made short or long, according to the fancy of the pad-maker, and when made short the supporting bridge-piece may be omitted entirely, and the shank of the terret, instead of passing through the hook, may pass through the side plate at some other point, all as will be readily understood.

I claim as my invention—

1. In a harness-tree, the combination, with the check-hook plate provided with loops, eyes, or slots, as described, of the metal side plates provided with the hooks and terrets passed through said hooks, substantially as described.

2. In a harness-tree, the combination, with the check-hook plate provided with loops, eyes, or slots, as described, of the metal side plates having the hooks, the bridge-pieces beneath the hooks, and the terrets passing through the hooks and said bridge-pieces, substantially as described.

3. The side plate provided with a hook, as described, and made open or cut away beneath the hook, in combination with the shouldered bridge-piece located beneath the end of the hook and seated in the opening in the plate and with the terret, substantially as described.

WILLIAM O. MILLER.

Witnesses:
O. S. DERINGER,
J. S. FRY.